United States Patent
Yang et al.

(10) Patent No.: US 9,559,604 B2
(45) Date of Patent: Jan. 31, 2017

(54) DC/DC CONVERTER AND CONTROL METHOD OF DC/DC CONVERTER

(71) Applicant: DELTA ELECTRONICS (SHANGHAI) CO., LTD., Shanghai (CN)

(72) Inventors: Zhongwang Yang, Shanghai (CN); Shengli Lu, Shanghai (CN); Qiong Zhang, Shanghai (CN); Guisong Huang, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 70 days.

(21) Appl. No.: 14/614,959

(22) Filed: Feb. 5, 2015

(65) Prior Publication Data

US 2015/0249396 A1 Sep. 3, 2015

(30) Foreign Application Priority Data

Feb. 28, 2014 (CN) .......................... 2014 1 0073167

(51) Int. Cl.
*H02M 3/335* (2006.01)
*H02M 3/337* (2006.01)

(52) U.S. Cl.
CPC ........... *H02M 3/3376* (2013.01); *H02M 3/335* (2013.01); *H02M 3/33507* (2013.01); *H02M 3/33592* (2013.01); *Y02B 70/1475* (2013.01)

(58) Field of Classification Search
CPC .................................................. H02M 3/335

(Continued)

(56) References Cited

U.S. PATENT DOCUMENTS 6,469,914 B1 10/2002 Hwang et al.
7,868,603 B2 1/2011 Lacombe et al.
(Continued)

FOREIGN PATENT DOCUMENTS

CN 1954480 4/2007
CN 101924469 12/2010
(Continued)

OTHER PUBLICATIONS

Office Action dated Sep. 30, 2015 from corresponding No. CN 201410073167.0.

*Primary Examiner* — Jue Zhang
*Assistant Examiner* — Trinh Dang
(74) *Attorney, Agent, or Firm* — Yunling Ren (57) ABSTRACT

A DC/DC converter and a control method thereof are disclosed. The DC/DC converter comprises: an output voltage regulation circuit configured to regulate an output voltage of the DC/DC converter, so as to output a duty cycle regulation signal; a PWM generator electrically coupled to the output voltage regulation circuit and configured to generate a first duty cycle signal according to a first clock signal and the duty cycle regulation signal; a detection circuit configured to output a control signal according to a second clock signal and a feedback signal, wherein the feedback signal is configured to detect whether or not the transient change of an input voltage of the DC/DC converter occurs; and a CBC regulation circuit electrically coupled to the PWM generator and the detection circuit, and configured to receive the first duty cycle signal and the control signal and output a second duty cycle signal.

19 Claims, 7 Drawing Sheets

(58) Field of Classification Search
USPC .......................... 363/21.1; 323/282, 283, 284
See application file for complete search history.

(56) References Cited

U.S. PATENT DOCUMENTS

| | | | | |
|---|---|---|---|---|
| 2003/0222633 | A1* | 12/2003 | Hwang | .................. H02M 1/36 |
| | | | | 323/282 |
| 2008/0067989 | A1 | 3/2008 | Kasai et al. | |
| 2009/0244934 | A1* | 10/2009 | Wang | ................ H02M 3/33592 |
| | | | | 363/21.06 |
| 2010/0283442 | A1* | 11/2010 | Nakashima | ......... H02M 3/1588 |
| | | | | 323/283 |
| 2014/0103860 | A1* | 4/2014 | Kominami | .............. H02M 1/32 |
| | | | | 320/103 |

FOREIGN PATENT DOCUMENTS

| | | |
|---|---|---|
| CN | 102638159 | 8/2012 |
| CN | 102801324 | 11/2012 |
| JP | 2007-236129 | 9/2007 |
| JP | 2011229214 | 11/2011 |
| JP | 4999500 | 8/2012 |
| JP | 2013094060 | 5/2013 |

\* cited by examiner

DC/DC CONVERTER AND CONTROL METHOD OF DC/DC CONVERTER

CROSS-REFERENCE TO RELATED APPLICATIONS

This application claims priority under 35 U.S.C. §119 to Chinese Patent Application No. 201410073167.0, filed on Feb. 28, 2014, the entire contents of which are incorporated herein by reference.

TECHNICAL FIELD

The present disclosure relates to the field of voltage converter technology, and more particularly, to a DC/DC converter and a control method thereof.

BACKGROUND

A DC/DC converter is used in electronic equipment and provides voltage and current conversion for a load or a post-stage DC/DC converter, and also prevents the load or the post-stage DC/DC converter from damaging by an abnormal input voltage. Therefore, a response time to transient change of the input voltage is an important technical parameter for the DC/DC converter. According to the conventional art, the DC/DC converter generally utilizes a PWM (Pulse-Width Modulation) controller to achieve the response to the transient change of the input voltage.

Figure 1:
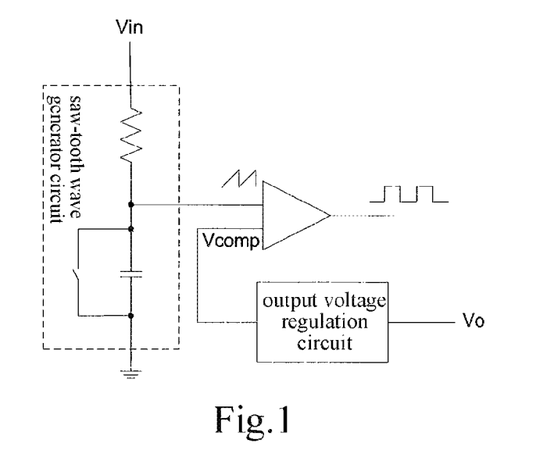
FIG. 1 is a block diagram showing a circuit of a traditional PWM controller with feed forward function.
Figure 2:
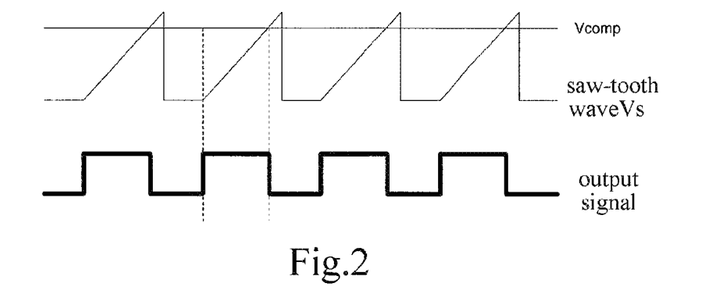
FIG. 2 shows waveforms in a process of realizing the feed forward function by the traditional PWM controller.

A traditional PWM controller, also known as an analog PWM controller, has a feed forward function to response to the transient change of the input voltage. Generally, this function is realized by regulating a slope of a saw-tooth waveform in the PWM controller. FIG. 1 is a block diagram showing a circuit of a traditional PWM controller with feed forward function. As shown in FIG. 1, the traditional PWM controller includes a saw-tooth wave generator, a voltage regulation circuit and a comparator. The saw-tooth wave generator works as a feed forward circuit. The voltage regulation circuit receives an output voltage of the DC/DC converter, and compares the output voltage with a reference voltage so as to generate a voltage Vcomp. Then the voltage Vcomp is compared with a saw-tooth wave voltage by the comparator to generate a duty cycle signal. FIG. 2 shows waveforms in a process of realizing the feed forward function by the traditional PWM controller. The saw-tooth wave voltage Vs rises upward at a starting point of each cycle, such that an output signal will be at a high level. Once the saw-tooth wave voltage Vs exceeds the voltage Vcomp, the output signal will remain a low level until a starting point of a next cycle. The saw-tooth wave voltage is generated by an input voltage Vin through a RC charge circuit, and the slope of the saw-tooth wave voltage depends on the input voltage Vin and any change of the input voltage Vin can directly affect the slope of the saw-tooth wave. Therefore, the duty cycle signal output from the comparator changes with the input voltage Vin. The circuit can quickly respond to the change of the input voltage, but cannot distinguish a stable state from a transient state. If the input voltage Vin keeps high level, the slope of the saw-tooth wave keeps high level and thus a high feedback gain will be generated. In other words, the feed forward circuit cannot be implanted very deeply due to the gain of the stable state. On the other hand, once the identification of the stable state of the input voltage is taken into consideration, the circuit cannot achieve a fast response to the transient change of the input voltage Vin.

Figure 3:
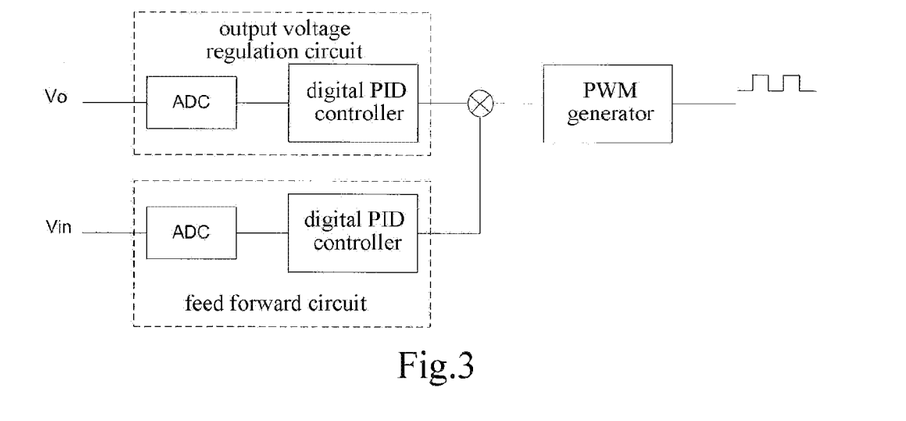
FIG. 3 is a block diagram showing a circuit of a digital PWM controller with feed forward function.

With the development of the digital control technology, digital PWM controllers have been widely applied to DC/DC converters due to the advantages of high integration and flexibility. Compared with traditional analog PWM controllers, digital PWM controllers have no need of the saw-tooth wave, and it is not necessary for the comparator to output the duty cycle signals. The duty cycle signals are generated directly by a firmware. However, the conventional digital PWM controllers cannot quickly respond to the transient change of the input voltage Vin. FIG. 3 is a block diagram showing a circuit of a digital PWM controller with feed forward function. As shown in FIG. 3, an independent control loop is introduced in the digital PWM controller. The input voltage Vin is converted into a digital signal through an ADC (Analog to Digital Conversion), and is input to a digital PID controller. A preset algorithm is performed in the digital PID controller, a corresponding value of the duty cycle signal is calculated according to Vin, and combined with a value of the duty cycle signal obtained from an output voltage regulation circuit. The preset algorithm in the digital PID controller may solve the problem of the stable state and transient state, but the response time is too long due to a time delay in ADC and also a program execution time for the firmware and it generally needs dozens of clock cycles to respond to the change of the input voltage.

Furthermore, another problem of the digital controller is that the controller is generally placed at the secondary side of the power converter. The primary side input voltage cannot be directly used as a control signal due to the signal isolation problem. Therefore, the secondary side voltage can only be set as the control signal instead of the input voltage. Although the secondary side voltage is closely related to the input voltage, they are not always identical. For example, in a bridge circuit, the secondary side voltage does not equal to the input voltage because that capacitors at the primary side are used to balance the duty cycle of a primary bridge. In this case, the change of the secondary side voltage fails to absolutely reflect the change of input voltage.

SUMMARY

The present disclosure provides a DC/DC converter and a control method thereof, to achieve a quick and precise response to a transient change of an input voltage.

Additional aspects and advantages of the present disclosure will partly be set forth in the following description, and may partly become apparent from the following description, or may be learned from the practice of the present disclosure.

According to one aspect of the present disclosure, there is provided a DC/DC converter, which includes: an output voltage regulation circuit configured to regulate an output voltage of the DC/DC converter, so as to output a duty cycle regulation signal; a PWM generator, electrically coupled to the output voltage regulation circuit, and configured to generate a first duty cycle signal according to a first clock signal and the duty cycle regulation signal; a detection circuit, configured to output a control signal according to a second clock signal and a feedback signal, wherein the second clock signal and the first clock signal keep the first duty cycle signal and the control signal in a same frequency, and the feedback signal is used to detect whether a transient change of an input voltage of the DC/DC converter occurs; and a CBC regulation circuit, electrically coupled to the PWM generator and the detection circuit and configured to output a second duty cycle signal according to the first duty cycle signal and the control signal.

According to another aspect of the present disclosure, there is provided a DC/DC converter, wherein the DC/DC converter may include: a transformer, a primary power circuit, a secondary bridge synchronous regulation circuit, an output inductor and a control circuit. The transformer may include a magnetic core, a primary winding electrically coupled to an output terminal of the primary power circuit, and a secondary winding electrically coupled to the secondary bridge synchronous regulation circuit. The primary power circuit is configured to receive an input voltage of the DC/DC converter, and perform a transmission process of symmetric power stream toward the secondary side of the transformer through the transformer during a positive switch cycle and a negative switch cycle, and the magnetic flux in the magnetic core of the transformer comes to a balance through the transmission process of symmetric power stream. The secondary bridge synchronous regulation circuit may include: a first switch, a first terminal of which is electrically coupled to a terminal of the output inductor, and a second terminal of which is electrically coupled to a first terminal of the secondary winding of the transformer; a second switch, a first terminal of which is electrically coupled to the second terminal of the first switch; a third switch, a first terminal of which is electrically coupled to the first terminal of the first switch, and a second terminal of which is electrically coupled to a second terminal of the secondary winding; a fourth switch, a first terminal of which is electrically coupled to the second terminal of the third switch, and a second terminal of which is electrically coupled to a second terminal of the second switch. The control circuit may include a time sequence circuit, an output voltage regulation circuit, a PWM generator, a detection circuit and a CBC regulation circuit. The time sequence circuit is configured to provide a primary drive signal to the primary power circuit and provide a secondary drive signal to the secondary bridge synchronous regulation circuit. The output voltage regulation circuit is configured to regulate an output voltage of the DC/DC converter to output a duty cycle regulation signal. The PWM generator is electrically coupled to the output voltage regulation circuit, and is configured to generate a first duty cycle signal according to a first clock signal and the duty cycle regulation signal. The detection circuit is configured to output a control signal according to a second clock signal and a feedback signal. The first clock signal and the second clock signal are configured to keep the first duty cycle signal and the control signal in a same frequency. The feedback signal is configured to detect whether or not a transient change of the input voltage of the DC/DC converter occurs. The CBC regulation circuit is electrically coupled to the PWM generator and the detection circuit, and is configured to output a second duty cycle signal according to the first duty cycle signal and the control signal.

According to yet another aspect of the present disclosure, there is provided a control method of a DC/DC converter, adapted to quickly responding to a transient change of an input voltage of the DC/DC converter, the DC/DC converter may include an output voltage regulation circuit, a PWM generator, a detection circuit and a CBC regulation circuit, wherein the control method may include: the output voltage regulation circuit receives an output voltage of the DC/DC converter and generates a duty cycle regulation signal according to the output voltage; the PWM generator generates a first duty cycle signal according to a first clock signal and the duty cycle regulation signal; the detection circuit outputs a control signal according to a second clock signal and a feedback signal, wherein the feedback signal is used to detect whether or not the transient change of an input voltage of the DC/DC converter occurs, and the second clock signal and the first clock signal keep the first duty cycle signal and the control signal in a same frequency; and the CBC regulation circuit outputs a second duty cycle signal according to the first duty cycle signal and the control signal.

Through the control circuit for responding the transient change of the input voltage according to the embodiments of the present disclosure, response to the transient change of the input voltage input may be in several clock cycles, even in only one clock cycle; unlike the control circuit of the traditional PWM controller, the parameter selection for the elements in the circuit does not affect the characteristics of the feedback loop; and further, compared with the control circuit in the digital PWM controller, multiple signals such as the input voltage, the output voltage and the output current may be used to sense the transient change of the input voltage.

BRIEF DESCRIPTION OF THE DRAWINGS

The above and other features and advantages of the present disclosure will become more apparent from the detailed description of exemplary embodiments thereof in reference to accompanying drawings, in which.

DETAILED DESCRIPTION

Hereinafter, exemplary embodiments are described more fully in reference to accompanying drawings. However, the exemplary embodiments may be implemented in various forms and should not be construed as limited to the embodiments set forth herein. Rather, these embodiments are provided to make the present disclosure more thorough and complete, and to convey the idea of the exemplary embodiments more fully to those skilled in the art.

The features, structures or characteristics described herein may be combined in one or more embodiments in any appropriate ways. In the following description, many particular details are provided for fully understanding of the present disclosure. However, it should be appreciated by those skilled in the art that, the technical solution of the present disclosure may be nevertheless implemented without one or more methods, elements and structures, etc., in the particular details, or with other methods, elements and structures, etc.

Figure 4:
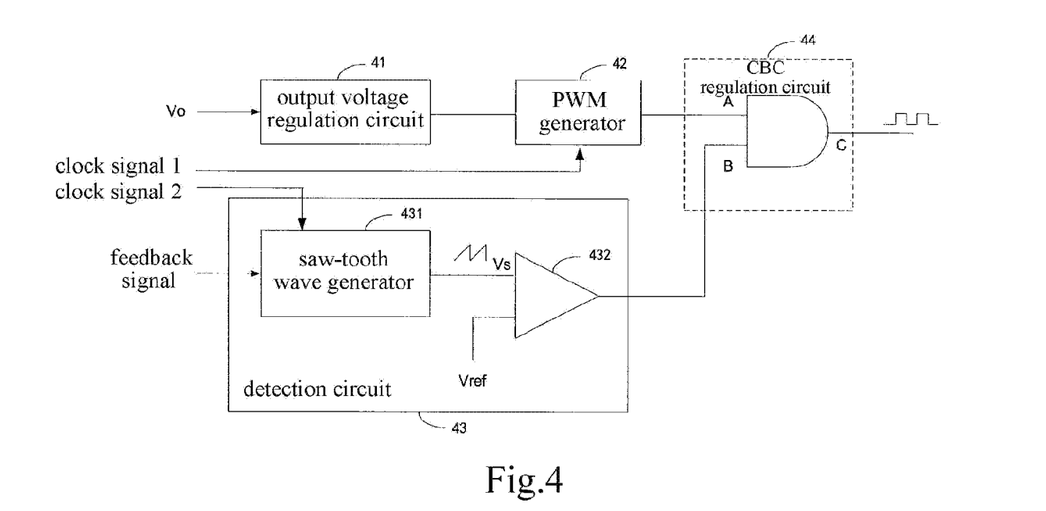
FIG. 4 a block diagram showing a control circuit for responding to transient change of the input voltage of a DC/DC converter according to the present disclosure.

FIG. 4 is a block diagram showing a control circuit for responding to a transient change of the input voltage of a DC/DC converter according to the present disclosure. Unlike the conventional feed forward circuit, an output voltage regulation circuit is separated from a detection circuit for detecting the transient change of the input voltage by use of the control circuit in the present disclosure. As shown in FIG. 4, the control circuit includes an output voltage regulation circuit 41, a PWM generator 42, a detection circuit 43 and a cycle-by-cycle (CBC) regulation circuit 44.

The output voltage regulation circuit 41 receives an output voltage Vo from the DC/DC converter and regulates the output voltage Vo, so as to output a duty cycle regulation signal. In some embodiments, the output voltage regulation circuit 41 is employed by the manner of analog circuit, the duty cycle regulation signal is a voltage error signal. In some embodiment, the output voltage regulation circuit 41 is employed by the manner of digital circuit, the duty cycle regulation signal is a preset duty cycle value, such as 50%.

The PWM generator 42 is electrically coupled to the output voltage regulation circuit 41, and generates a first duty cycle signal according to the received clock signal 1 and the abovementioned duty cycle regulation signal. For the digital method, the first duty cycle signal is a square wave pulse signal that is corresponding to the preset duty cycle value. For example, a high level duration of the square wave pulse signal in one cycle equals to a result of multiplying a whole cycle with the preset duty cycle value.

The detection circuit 43 includes a saw-tooth wave generator 431 and a comparator 432.

The saw-tooth wave generator 431 receives a feedback signal and a clock signal 2, and generates a saw-tooth wave signal. When the transient change of the input voltage of the DC/DC converter occurs, the saw-tooth wave generator 431 changes a slope, a level or an average level of the saw-tooth wave signal according to the feedback signal. The feedback signal is, for example, at least one selected from an input voltage Vin, the output voltage Vo and an output current Io, and is used to detect whether or not the transient change of the input voltage of the DC/DC converter has occurred. According to an embodiment of the present disclosure, the input voltage Vin may be replaced with a secondary side voltage, which is proportional to the input voltage Vin, of a transformer of the DC/DC converter. The comparator 432 which is electrically coupled to the saw-tooth wave generator 431, is configured to compare the saw-tooth wave output from the saw-tooth wave generator 431 with a reference voltage Vref, so as to output a control signal according to the comparison. The reference voltage Vref is a preset value and may be generated by a reference voltage generation circuit, but the present disclosure is not limited thereto.

In one embodiment, in order to keep the first duty cycle signal and the control signal in a same frequency, the clock signal 1 received by the PWM generator 42 and the clock signal 2 received by the saw-tooth wave generator 431 may be the same clock synchronization signal having a clock cycle.

The CBC regulation circuit 44 is electrically coupled to the PWM generator 42 and the detection circuit 43, respectively. The CBC regulation circuit 44 receives the first duty cycle signal output from the PWM generator 42 and the control signal output from the detection circuit 43, and outputs a second duty cycle signal.

In an embodiment of the present disclosure, the CBC regulation circuit 44 includes a logic AND gate circuit, and the CBC regulation circuit 44, which is implemented by a logic AND gate circuit, is taken an example in the following description, but the present disclosure is not limited thereto.

Figure 5:
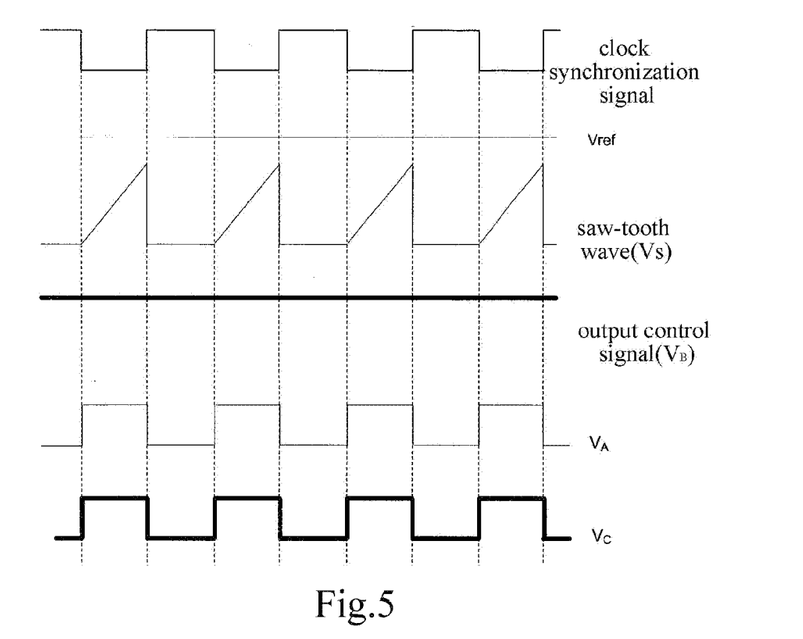
FIG. 5 is a schematic view showing a time sequence of respective critical signal waveforms when the input voltage is stable.
Figure 6:
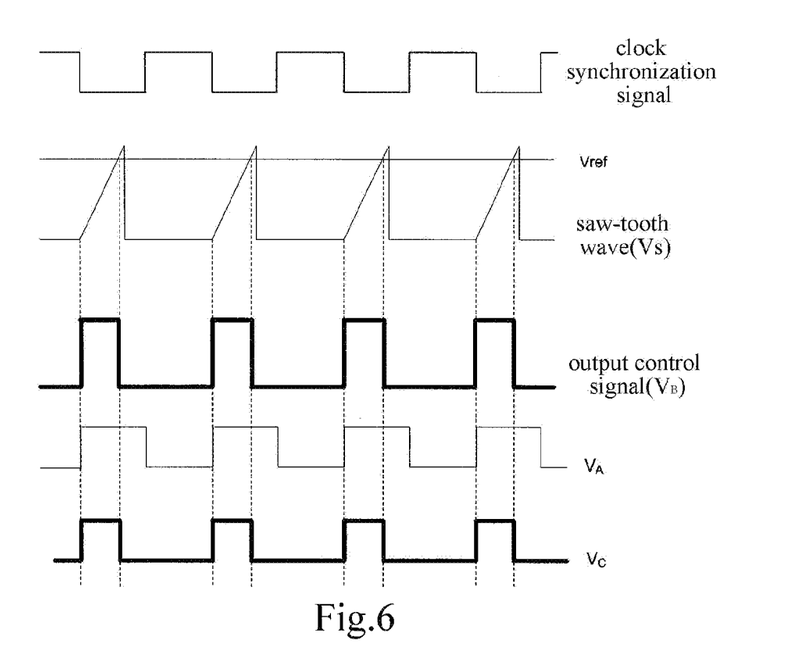
FIG. 6 is a schematic view showing a time sequence of respective critical signal waveforms when the transient change of the input voltage occurs.

The comparator 432 compares the saw-tooth wave signal with the reference voltage Vref, and results of the comparison are respectively shown in FIG. 5 and FIG. 6.

FIG. 5 is a schematic view showing a time sequence of respective key signal waveforms when the input voltage is stable. As shown in FIG. 5, a saw-tooth wave signal Vs is always less than the reference voltage Vref. Consequently, the comparator 432 generates a constant high level at node B, i.e., the control signal is at a high level.

At node A on the other side of the CBC regulation circuit 44, the PWM generator 42 generates the first duty cycle signal. Since the AND gate is "ON", the duty cycle signal is output at an output node C of the AND gate, i.e., the second duty cycle signal is consistent with the first duty cycle signal.

FIG. 6 is a schematic view showing a time sequence of respective critical signal waveforms when the transient change of the input voltage occurs. As shown in FIG. 6, when the transient change of the input voltage occurs, the slope of the saw-tooth wave signal is changed or the average level thereof is elevated. In particular, the change of the saw-tooth wave signal is determined by the feedback signal which is, for example, at least one selected from output voltage Vo, output current Io and input voltage Vin.

In an embodiment of the present disclosure, by separating the output voltage regulation circuit 41 from the detection circuit 43, the feedback loop and the detection circuit may be more independent and it is easy to implant more signals which may quickly respond to the transient change of the input voltage. For example, once there is a step change of the input voltage, since the output voltage Vo has not changed with it temporarily and an output inductor cannot keep a voltage-second balance, there will be a significant change of the output current Io. Therefore, the output current Io is more sensitive to the transient change of the input voltage and thus is more suitable to reflect the transient change of the input voltage. In this embodiment, even if the input voltage is not precisely detected, the step change of the input voltage may be reflected by the output current Io.

There are provided several different designs for the saw-tooth wave generator 431.

Figure 7:
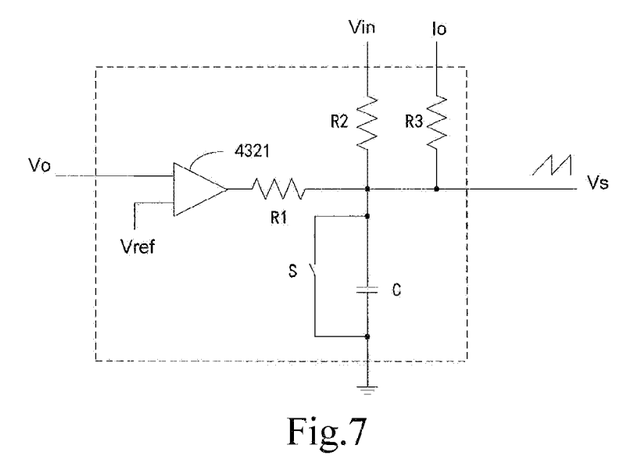
FIG. 7 is a block diagram showing a circuit of a saw-tooth wave generator according to a first illustrative embodiment.

FIG. 7 is a block diagram showing a circuit of a saw-tooth wave generator according to a first illustrative embodiment. As shown in FIG. 7, the saw-tooth wave generator respectively receives signals Vo, Vin and Io and includes a comparator 4321, resistors R1-R3, a capacitor C and a switch S.

Since the output voltage Vo has a constant DC level, once the input voltage transiently changes, there is only a change of a small percentage in Vo, such as 5%, therefore it is necessary to remove the DC level from Vo before Vo is applied. For example, the DC level may be removed from Vo by the comparator 4321. The comparator 4321 compares the output voltage Vo and a reference voltage Vref', and outputs an output voltage of which the DC level is removed.

The resistors R1, R2 are electrically coupled to the resistor R3, respectively, to combine Vo, Vin and Io. More particularly, Vo, of which the DC level is removed, passes through the resistor R1 is combined with Vin passed through the resistor R2 and Io passed through the resistor R3, respectively. The values of respective resistors determine weights of the three signals in the combined signal.

The values of respective resistors may be optimized according to different power converter topologies, or may be modified based on experiment results. The capacitor C is electrically coupled to the resistors R1, R2 and R3 respectively, and is configured to generate a ramp-up wave. The capacitor C is paralleled with the switch S. The switch S is a discharge switch, and once the clock synchronization signal comes, the switch S is turned on to discharge the capacitor C and reset the detection circuit.

Figure 8:
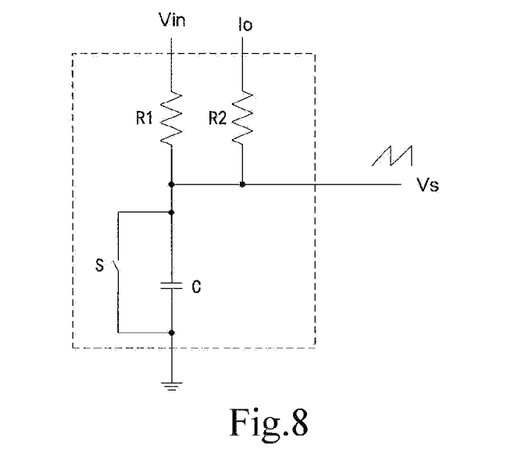
FIG. 8 is a block diagram showing a circuit of a saw-tooth wave generator according to a second illustrative embodiment.

FIG. 8 is a block diagram showing a circuit of a saw-tooth wave generator according to a second illustrative embodiment. As shown in FIG. 8, the saw-tooth wave generator respectively receives Vin and Io and includes resistors R1, R2, a capacitor C and a switch S. The resistor R1 is electrically coupled to the resistor R2 to combine Vin and Io. More particularly, Vin passed through the resistor R1 is combined with Io passed through the resistor R2. Likewise, values of respective resistors may be adjusted to change weight of the two signals in the combined signal.

In the case that Vin cannot precisely reflect the transient change of the input voltage, for example, Vin is a secondary side voltage, Io can more precisely reflect the transient change of the input voltage, while the weight of Vin is reduced.

The capacitor C is coupled to the resistors R1 and R2 respectively and is configured to generate a ramp-up wave, and is connected to the switch S in parallel. The switch S is a discharge switch, and once the clock synchronization signal comes, the switch S is turned on to discharge the capacitor C and reset the detection circuit.

Figure 9:
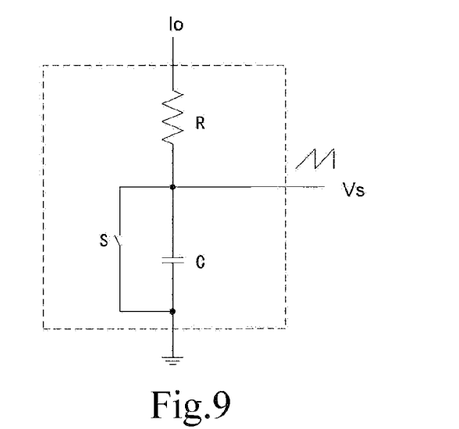
FIG. 9 is a block diagram showing a circuit of a saw-tooth wave generator according to a third illustrative embodiment.

FIG. 9 is a block diagram showing a circuit of a saw-tooth wave generator according to a third embodiment. As shown in FIG. 9, the saw-tooth wave generator only receives Io to reflect the transient change of the input voltage and includes a resistor R, a capacitor C and a switch S. The capacitor C is electrically coupled to the resistor R and is configured to generate a ramp-up wave, and is connected to the switch S in parallel. The switch S is a discharge switch, and once the clock synchronization signal comes, the switch S is turned on to discharge the capacitor C and reset the detection circuit.

Figure 10:
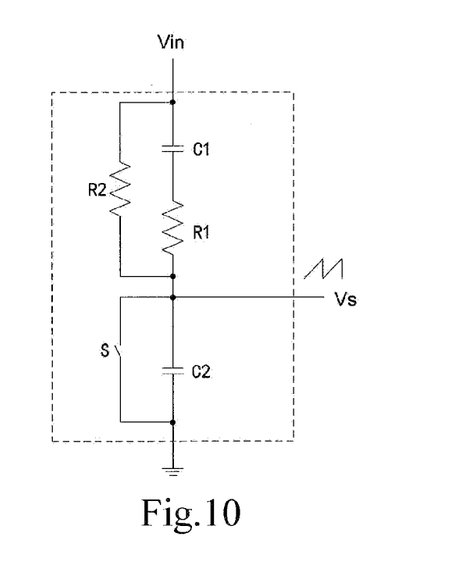
FIG. 10 is a block diagram showing a circuit of a saw-tooth wave generator according to a fourth illustrative embodiment.

FIG. 10 is a block diagram showing a circuit of a saw-tooth wave generator according to a fourth illustrative embodiment. As shown in FIG. 10, the saw-tooth wave generator only receives Vin to reflect the transient change of the input voltage and includes resistors R1, R2, capacitors C1, C2 and a switch S. The resistor R2 is connected in parallel to a resistor-capacitor network composed of the capacitor C1 and the resistor R1, and is connected to the capacitor C2 to charge the capacitor C2; the switch S is a discharge switch and is connected to the capacitor C2; and once the clock synchronization signal comes, the switch S is turned on to discharge the capacitor C and reset the detection circuit.

The resistor-capacitor network is configured to improve the response time of quickly responding to the input voltage change. Different from the saw-tooth wave generator in the related art shown in FIG. 1, when Vin is stable, only R2 loop is turned on; and when a transient change of Vin occurs, both of R1 and C1 loop are turned on. The resistor R2 is connected in parallel with the resistor-capacitor network composed of the capacitor C1 and the resistor R1 to change the saw-waved output voltage Vs, thereby realizing the fast response. Since the resistor R2 used for charging the capacitor C2 does not affect the gain of the feedback loop, it is more flexible to select the value of the resistor R1.

In one embodiment, the control circuit for responding to the transient change of the input voltage may be applied to the traditional PWM controller as well as to the digital PWM controller.

When the control circuit is applied to the digital PWM controller, most part of the control circuit shown in FIG. 4 may be directly incorporated into the existing digital PWM controller, and only an additional external circuit is needed to be added so as to implement the present disclosure.

Figure 11:
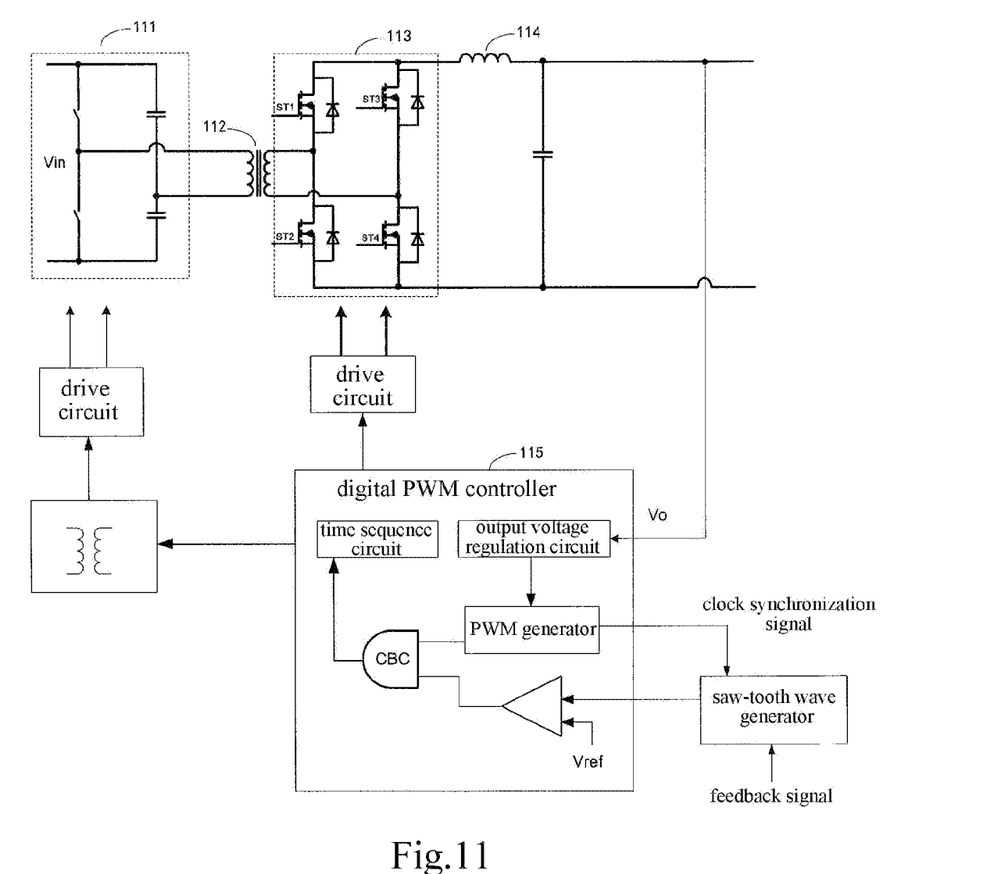
FIG. 11 is a block diagram showing a circuit to which the DC/DC converter of the control circuit shown in FIG. 4 is applied.

FIG. 11 is a block diagram showing a circuit to which the DC/DC converter of the control circuit shown in FIG. 4 is applied. As shown in FIG. 4, the DC/DC converter includes a primary power circuit 111, a transformer 112, a secondary bridge synchronous regulation circuit 113, an output inductor 114 and the control circuit 115 shown in FIG. 4.

The transformer 112 has a magnetic core, a primary winding and a secondary winding. The primary winding of the transformer 112 is coupled to an output terminal of the primary power circuit 111.

The primary power circuit 111 receives the input voltage Vin, and performs a transmission process of symmetric power stream toward the secondary side of the transformer 112 through the transformer 112 during a positive switch cycle and a negative switch cycle. The magnetic flux in the magnetic core of the transformer comes to a balance through the transmission process of symmetric power stream.

The secondary bridge synchronous regulation circuit 113 electrically coupled to the secondary winding of the transformer 112, and comprises a first switch ST1, a second switch ST2, a third switch ST3 and a fourth switch ST4. Specifically, a first terminal of the first switch ST1 is electrically coupled to one terminal of the output inductor 114, and a second terminal thereof is electrically coupled to a first terminal of the secondary winding of the transformer 112. A first terminal of the second switch ST2 is electrically coupled to the second terminal of the first switch ST1. A first terminal of the third switch ST3 is electrically coupled to the first terminal of the first switch ST1, and a second terminal thereof is electrically coupled to a second terminal of the secondary winding of the transformer 112. A first terminal of the fourth switch ST4 is electrically coupled to the second terminal of the third switch ST3, and a second terminal thereof is electrically coupled to a second terminal of the second switch ST2.

The control circuit 115 includes a time sequence circuit, an output voltage regulation circuit, a PWM generator, a comparator and a CBC regulation circuit. The time sequence circuit provides a primary drive signal to the primary power circuit 111 and provides a secondary drive signal to the secondary bridge synchronous regulation circuit 113. The output voltage regulation circuit regulates the output voltage of the DC/DC converter to output a duty cycle regulation signal. The PWM generator is electrically coupled to the output voltage regulation circuit, receives the clock synchronization signal (which may be generated inside the PWM generator) and the duty cycle regulation signal, and generates a first duty cycle signal according to the clock synchronization signal and the duty cycle regulation signal. The CBC regulation circuit is electrically coupled to the PWM generator and the comparator, and outputs a second duty cycle signal according to the first duty cycle signal and the control signal output from the comparator.

The output voltage regulation circuit and the PWM generator in the control circuit 115 may be implemented with the output voltage regulation circuit and the PWM generator existed in the digital PWM controller. The CBC regulation circuit, the comparator of the detection circuit and the reference voltage are incorporated into the digital PWM controller and may be implemented with hardware or firmware in the digital PWM controller. Thus, only an additional saw-tooth wave generator is needed to be added.

The control circuit for responding to the transient change of the input voltage has the following advantages over that in the related art.

1) It may quickly respond to the transient change of the input voltage input in several clock cycles, even in one clock cycle; while the feed forward circuit in the conventional digital PWM controller generally takes dozens of clock cycles.

2) The parameter selection for the elements in the circuit does not affect the characteristics of the feedback loop, and the optimized parameters may realize the best performance of the control circuit; while the parameter will affect the gain of feedback loop according to the feed forward circuit of a conventional analog PWM controller.

3) Compared with the conventional digital PWM controller, multiple signals may be used to sense input voltage transient change of the control circuit of the present disclosure; and it still has a good performance in the case that the secondary side voltage is selected as the feedback signal. The deviation of the output voltage can be well controlled within a smaller range, such as 1%.

Figure 12:
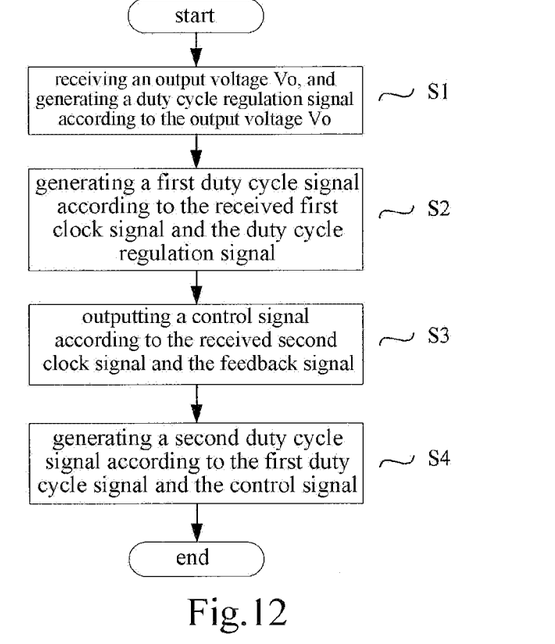
FIG. 12 is a flowchart showing a control method for responding to the transient change of the input voltage.

FIG. 12 is a flowchart showing a control method for responding to the transient change of the input voltage which is applied to the control circuit shown in FIG. 4. Referring to FIG. 4 together with FIG. 12, the method includes the following steps.

In Step S1, an output voltage Vo is received, and a duty cycle regulation signal is generated according to the output voltage Vo.

In particular, the output voltage regulation circuit 41 receives the output voltage Vo and regulates output voltage Vo, so as to output the duty cycle regulation signal. Specifically, in the case that the output voltage regulation circuit 41 is implemented in an analog method, the duty cycle regulation signal is a voltage error signal. In the case that the output voltage regulation circuit 41 is implemented in a digital manner, the duty cycle regulation signal is a preset duty cycle value such as 50%.

In Step S2, a clock signal 1 and the duty cycle regulation signal are received, and a first duty cycle signal is generated according to the clock signal 1 and the duty cycle regulation signal.

Specifically, the PWM generator receives the clock signal 1 and the duty cycle regulation signal, and generates the first duty cycle signal according to the clock signal 1 and the duty cycle regulation signal. For example, the duty cycle regulation signal is a preset duty cycle value such as 50%, and the first duty cycle signal is a square impulse signal corresponding to the first duty cycle signal.

In Step S3, a clock signal 2 and a feedback signal are received, and a control signal is output according to the clock signal 2 and the feedback signal.

In particular, the saw-tooth wave generator 431 receives the clock signal 2 and the feedback signal, generates a saw-tooth wave signal, and regulates the slope, level or average level of the saw-tooth wave signal according to the feedback signal. The feedback signal is, for example, at least one selected from the input voltage Vin, the output voltage Vo and the output current Io, and is used to detect whether or not a transient change of the input voltage of the DC/DC converter occurs. The clock signal 1 and the clock signal 2 keep the first duty cycle signal and the control signal in the same frequency.

The comparator 432 compares the saw-tooth wave signal with the reference voltage Vref, and outputs the control signal to the CBC regulation circuit 44 according to the result of the comparison.

In Step S4, a second duty cycle signal is generated according to the first duty cycle signal and the control signal.

In particular, the CBC regulation circuit 44 respectively receives the first duty cycle signal and the control signal, and outputs the second duty cycle signal.

According to an embodiment of the present disclosure, the CBC regulation circuit 44 may be implemented with an AND gate circuit. The CBC regulation circuit 44 respectively receives the first duty cycle signal and the control signal, and performs logic AND operation on them, so as to output a second duty cycle signal.

When the input voltage keeps constant, the control signal is at a high level, and the second duty cycle signal is consistent with the first duty cycle signal. When a transient change of the input voltage occurs, the control signal is a square impulse signal, and the second duty cycle signal is a signal obtained from the logic AND operation performed on the first duty cycle signal and the control signal.

Through the control method for responding to the transient change of the input voltage according to the embodiments of the present disclosure, response to the transient change of the input voltage input may be in several clock cycles, even in only one clock cycle; unlike the control circuit of the traditional PWM controller, the parameter selection for the elements in the circuit does not affect the characteristics of the feedback loop; and compared with the control circuit in the digital PWM controller, multiple signals such as the input voltage, the output voltage and the output current may be used to sense the transient change of the input voltage.

The exemplary embodiments of the present disclosure have been specifically illustrated and described above. It should be understood that, the present disclosure is not limited to the disclosed embodiments. Rather, the present disclosure is intended to embrace various modifications and equivalences within the scope of the appended claims.

What is claimed is:

1. A DC/DC converter comprising:
   an output voltage regulation circuit configured to regulate an output voltage of the DC/DC converter, so as to output a duty cycle regulation signal;
   a PWM generator electrically coupled to the output voltage regulation circuit, and configured to generate a first duty cycle signal according to a first clock signal and the duty cycle regulation signal;
   a detection circuit configured to output a control signal according to a second clock signal and a feedback signal, wherein the second clock signal and the first clock signal keep the first duty cycle signal and the control signal in a same frequency, and the feedback signal is used to detect whether or not a transient change of an input voltage of the DC/DC converter occurs; and
   a CBC regulation circuit electrically coupled to the PWM generator and the detection circuit, and configured to output a second duty cycle signal according to the first duty cycle signal and the control signal, wherein when a transient change of the input voltage occurs, the control signal is a square wave signal, and the second duty cycle signal is a signal which is obtained by performing a logic AND operation with the first duty cycle signal and the control signal.

2. The DC/DC converter according to claim 1, wherein the feedback signal is at least one selected from the input voltage of the DC/DC converter, the output voltage of the DC/DC converter, and an output current of the DC/DC converter.

3. The DC/DC converter according to claim 1, wherein the detection circuit comprises:
  a saw-tooth wave generator configured to generate a saw-tooth wave signal and regulate a slope, a level or an average level of the saw-tooth wave signal according to the second clock signal and the feedback signal; and
  a comparator electrically coupled to the saw-tooth wave generator and configured to compare the saw-tooth wave signal with a first reference voltage so as to generate the control signal.

4. The DC/DC converter according to claim 1, wherein the CBC regulation circuit comprises a logic AND gate circuit.

5. The DC/DC converter according to claim 1, wherein the detection circuit is configured to generate the control signal according to each clock period of the second clock signal.

6. The DC/DC converter according to claim 3, wherein the output voltage regulation circuit, the PWM generator, the comparator and the CBC regulation circuit are integrated into a digital PWM controller, and the first reference voltage is generated inside the digital PWM controller.

7. The DC/DC converter according to claim 4, wherein when the input voltage is stable, the control signal is at a high level, and the second duty cycle signal is consistent with the first duty cycle signal.

8. A DC/DC converter comprising a transformer, a primary power circuit, a secondary bridge synchronous regulation circuit, an output inductor and a control circuit, wherein
  the transformer comprises a magnetic core, a primary winding electrically coupled to an output terminal of the primary power circuit, and a secondary winding electrically coupled to the secondary bridge synchronous regulation circuit;
  the primary power circuit is configured to receive an input voltage of the DC/DC converter, and transmit symmetric power stream toward the secondary side of the transformer during a positive switch cycle and a negative switch cycle, wherein magnetic flux in the magnetic core of the transformer reaches a balance through the transmission process of symmetric power stream;
  the secondary bridge synchronous regulation circuit comprises:
    a first switch having a first terminal electrically coupled to a terminal of the output inductor, and a second terminal electrically coupled to a first terminal of the secondary winding of the transformer;
    a second switch having a first terminal electrically coupled to the second terminal of the first switch;
    a third switch having a first terminal electrically coupled to the first terminal of the first switch, and a second terminal electrically coupled to a second terminal of the secondary winding;
    a fourth switch having a first terminal electrically coupled to the second terminal of the third switch, and a second terminal electrically coupled to a second terminal of the second switch; and
  the control circuit comprises a time sequence circuit, an output voltage regulation circuit, a PWM generator, a detection circuit and a CBC regulation circuit, wherein the time sequence circuit is configured to provide a primary drive signal for the primary power circuit and provide a secondary drive signal for the secondary bridge synchronous regulation circuit; the output voltage regulation circuit is configured to regulate an output voltage of the DC/DC converter to output a duty cycle regulation signal; the PWM generator is electrically coupled to the output voltage regulation circuit and is configured to generate a first duty cycle signal according to a first clock signal and the duty cycle regulation signal; the detection circuit is configured to output a control signal according to a second clock signal and a feedback signal; the first clock signal and the second clock signal are configured to keep the first duty cycle signal and the control signal in a same frequency; the feedback signal is configured to detect whether or not a transient change of the input voltage of the DC/DC converter occurs; the CBC regulation circuit is electrically coupled to the PWM generator and the detection circuit, and is configured to output a second duty cycle signal according to the first duty cycle signal and the control signal, wherein when a transient change of the input voltage occurs, the control signal is a square wave signal, and the second duty cycle signal is a signal which is obtained by performing a logic AND operation with the first duty cycle signal and the control signal.

9. The DC/DC converter according to claim 8, wherein when an output voltage of the primary power circuit is substantially zero, the control circuit is configured to control each of the first switch, the second switch, the third switch and the fourth switch to be turned on.

10. The DC/DC converter according to claim 8, wherein the detection circuit comprises a saw-tooth wave generator and a comparator, wherein
  the saw-tooth wave generator is configured to generate a saw-tooth wave signal and regulate a slope, a level or an average level of the saw-tooth wave signal according to the feedback signal and the second clock signal; and
  the comparator is electrically coupled to the saw-tooth wave generator and is configured to compare the saw-tooth wave signal with a first reference voltage so as to generate the control signal.

11. The DC/DC converter according to claim 8, wherein the detection circuit is configured to generate the control signal according to each clock period of the second clock signal.

12. The DC/DC converter according to claim 8, wherein the output voltage regulation circuit, the PWM generator and the CBC regulation circuit are integrated into a digital PWM controller.

13. The DC/DC converter according to claim 8, wherein the CBC regulation circuit is electrically coupled to the time sequence circuit, and the time sequence circuit is configured to generate a time sequence between the primary drive signal and the secondary drive signal according to the second duty cycle signal.

14. The DC/DC converter according to claim 10, wherein the CBC regulation circuit comprises a logic AND gate circuit.

15. The DC/DC converter according to claim 14, wherein when the input voltage is stable, the control signal is at a high level, and the second duty cycle signal is consistent with the first duty cycle signal.

16. A control method of a DC/DC converter, used to quickly responding to a transient change of an input voltage of the DC/DC converter, the DC/DC converter comprises an output voltage regulation circuit, a PWM generator, a detection circuit and a CBC regulation circuit, comprising:
the output voltage regulation circuit receiving an output voltage of the DC/DC converter and generating a duty cycle regulation signal according to the received output voltage;
the PWM generator generating a first duty cycle signal according to a first clock signal and the duty cycle regulation signal;
the detection circuit outputting a control signal according to a second clock signal and a feedback signal, wherein the feedback signal is used to detect whether or not the transient change of the input voltage of the DC/DC converter occurs, and the second clock signal and the first clock signal keep the first duty cycle signal and the control signal in a same frequency; and
the CBC regulation circuit outputting a second duty cycle signal according to the first duty cycle signal and the control signal,
wherein when the transient change of the input voltage occurs, the control signal is a square wave signal, and the second duty cycle signal is a signal which is obtained by performing a logic AND operation with the first duty cycle signal and the control signal.

17. The control method according to claim 16, wherein the CBC regulation circuit comprises a logic AND gate circuit.

18. The control method according to claim 16, wherein the detection circuit comprises:
a saw-tooth wave generator configured to generate a saw-tooth wave signal and to regulate a slope, a level or an average level of the saw-tooth wave signal according to the second clock signal and the feedback signal; and
a comparator electrically coupled to the saw-tooth wave generator and configured to compare the saw-tooth wave signal with a first reference voltage so as to generate the control signal.

19. The control method according to claim 17, wherein when the input voltage is stable, the control signal is at a high level, and the second duty cycle signal is consistent with the first duty cycle signal.

* * * * *